(12) United States Patent
Lentine

(10) Patent No.: US 9,752,761 B2
(45) Date of Patent: Sep. 5, 2017

(54) LANDSCAPE LIGHT

(71) Applicant: Telebrands Corp., Fairfield, NJ (US)

(72) Inventor: Lou Lentine, Chattanooga, TN (US)

(73) Assignee: Telebrands Corp., Fairfield, NJ (US)

( * ) Notice: Subject to any disclaimer, the term of this patent is extended or adjusted under 35 U.S.C. 154(b) by 0 days.

(21) Appl. No.: 15/142,789

(22) Filed: Apr. 29, 2016

(65) Prior Publication Data

US 2016/0238221 A1     Aug. 18, 2016

Related U.S. Application Data

(63) Continuation of application No. 14/801,458, filed on Jul. 16, 2015.
(Continued)

(51) Int. Cl.
| | |
|---|---|
| *F21V 21/08* | (2006.01) |
| *F21V 5/04* | (2006.01) |
| *F21V 15/01* | (2006.01) |
| *F21V 23/00* | (2015.01) |
| *F21V 23/04* | (2006.01) |

(Continued)

(52) U.S. Cl.
CPC ............ *F21V 21/0824* (2013.01); *F21V 5/04* (2013.01); *F21V 15/01* (2013.01); *F21V 23/001* (2013.01); *F21V 23/045* (2013.01); *F21V 23/0407* (2013.01); *F21V 23/0435* (2013.01); *F21W 2131/10* (2013.01); *F21Y 2115/30* (2016.08); *G02B 5/0252* (2013.01)

(58) Field of Classification Search
CPC .... F21V 21/0824; F21V 23/0407; F21V 5/04; F21V 23/0435; F21V 23/001; F21W 2131/10
See application file for complete search history.

(56) References Cited

U.S. PATENT DOCUMENTS

| | | |
|---|---|---|
| 3,104,064 A | 9/1963 | Bellek |
| D231,559 S | 4/1974 | Darling |

(Continued)

FOREIGN PATENT DOCUMENTS

| | | |
|---|---|---|
| CN | 201173996 | 12/2008 |
| CN | 202691883 | 1/2013 |

(Continued)

OTHER PUBLICATIONS

Laser Light, available at www.amazon.com, accessed on Nov. 13, 2015.

(Continued)

*Primary Examiner* — Donald Raleigh
*Assistant Examiner* — Kevin Quarterman
(74) *Attorney, Agent, or Firm* — Cooper & Dunham, LLP

(57) ABSTRACT

A landscape light incorporating two or more lasers or LEDs of different colors (e.g., red, green, white, blue) in the same housing, each laser or LED preferably having a separate lens. The apparatus projects any of a variety of colors including red, green, white, blue, or other colors, or combinations of any colors, as well as providing an optional flash/pulse setting for the lights. The apparatus preferably includes an RF remote which enables the user to control the apparatus from anywhere in and around the house, and may also include a built-in timer which runs the lights for selected periods such as 2, 4, 6, or 8 hours.

11 Claims, 1 Drawing Sheet

Related U.S. Application Data

(60) Provisional application No. 62/025,344, filed on Jul. 16, 2014.

(51) Int. Cl.
*F21W 131/10* (2006.01)
*F21Y 115/30* (2016.01)
*G02B 5/02* (2006.01)

(56) References Cited

U.S. PATENT DOCUMENTS

| | | |
|---|---|---|
| 3,822,930 A | 7/1974 | Douklias |
| D234,710 S | 4/1975 | Beeren |
| 3,944,761 A | 3/1976 | Nicholl |
| 4,114,112 A | 9/1978 | Epstein |
| 4,307,528 A | 12/1981 | Dewees |
| 4,458,124 A | 7/1984 | Kroth |
| D278,215 S | 4/1985 | Patterson |
| 4,557,055 A | 12/1985 | Arai |
| D282,104 S | 1/1986 | Taylor |
| 4,779,176 A | 10/1988 | Bornhorst |
| 4,814,961 A | 3/1989 | O'Brien |
| 5,036,447 A | 7/1991 | Taylor |
| D323,406 S | 1/1992 | Fisher |
| 5,086,379 A | 2/1992 | Denison |
| 5,090,789 A | 2/1992 | Crabtree |
| D333,526 S | 2/1993 | Taylor |
| 5,280,417 A | 1/1994 | Hall |
| 5,367,349 A | 11/1994 | Zeiler |
| 5,398,180 A | 3/1995 | Lee |
| 5,459,539 A | 10/1995 | Yamamoto |
| D365,169 S | 12/1995 | Fillipp |
| D370,070 S | 5/1996 | Kay |
| 5,613,799 A | 3/1997 | Guide |
| 5,626,418 A | 5/1997 | Angelis |
| D389,935 S | 1/1998 | Pink |
| 5,882,107 A | 3/1999 | Bornhorst |
| D414,579 S | 9/1999 | Denison |
| 5,971,545 A | 10/1999 | Haitz |
| 6,000,813 A | 12/1999 | Krietzman |
| 6,145,228 A | 11/2000 | LaChance |
| D437,652 S | 2/2001 | Uhler |
| 6,190,025 B1 | 2/2001 | Solinsky |
| D438,999 S | 3/2001 | Bossy |
| 6,304,237 B1 | 10/2001 | Karakawa |
| 6,474,837 B1 | 11/2002 | Belliveau |
| 6,655,817 B2 | 12/2003 | Devlin |
| 6,722,771 B1 | 4/2004 | Stephens |
| 6,802,630 B2 | 10/2004 | Doppelt |
| 6,874,893 B2 | 4/2005 | Park |
| 7,040,780 B2 | 5/2006 | Diehl |
| 7,257,551 B2 | 8/2007 | Oskorep |
| D550,877 S | 9/2007 | Mullen |
| D551,789 S | 9/2007 | Mullen |
| 7,369,584 B2 | 5/2008 | Goldman |
| D574,532 S | 8/2008 | Lee |
| D589,191 S | 3/2009 | Sabernig |
| D604,880 S | 11/2009 | Lovegrove |
| RE41,050 E | 12/2009 | Panasewicz |
| D605,325 S | 12/2009 | Sanoner |
| 7,641,345 B2 | 1/2010 | Johnson |
| D616,586 S | 5/2010 | Sabernig |
| 7,832,918 B2 | 11/2010 | Chien |
| 8,003,886 B1 | 8/2011 | Rintz |
| 8,057,045 B2 | 11/2011 | Johnson |
| 8,100,537 B2 | 1/2012 | Johnson |
| 8,100,538 B2 | 1/2012 | Kuroda |
| D654,606 S | 2/2012 | Chen |
| D659,871 S | 5/2012 | Lee |
| D667,981 S | 9/2012 | Connolly |
| 8,297,825 B2 | 10/2012 | Onishi |
| 8,303,129 B1 | 11/2012 | Thielen |
| 8,366,292 B2 | 2/2013 | McDermott |
| 8,376,574 B2 | 2/2013 | Spartano |
| 8,436,553 B2 | 5/2013 | Zampini |
| 8,480,233 B2 | 7/2013 | Smith |
| 8,485,686 B2 | 7/2013 | Swan |
| 8,693,513 B2 | 4/2014 | Achtenhagen |
| 8,721,160 B2 | 5/2014 | Chien |
| 8,901,827 B1 | 12/2014 | Xu |
| D723,726 S | 3/2015 | Reed |
| D738,023 S | 9/2015 | Rosello Gratacos |
| D773,707 S | 12/2016 | Lentine |
| D777,965 S | 1/2017 | Mirchandani |
| D779,098 S | 2/2017 | Tsai |
| 2002/0101571 A1 | 8/2002 | Panasewicz |
| 2003/0189825 A1 | 10/2003 | Tauch |
| 2004/0119951 A1 | 6/2004 | Vitantonio |
| 2004/0141316 A1 | 7/2004 | Twardawski |
| 2005/0024863 A1 | 2/2005 | Phipps |
| 2005/0243560 A1 | 11/2005 | Chen |
| 2006/0158138 A1 | 7/2006 | Walter |
| 2006/0198153 A1 | 9/2006 | Chien |
| 2007/0064290 A1 | 3/2007 | Hochenbleicher |
| 2008/0224849 A1 | 9/2008 | Sirhan |
| 2008/0316732 A1 | 12/2008 | Blake |
| 2009/0027900 A1 | 1/2009 | Janos |
| 2009/0033814 A1 | 2/2009 | Khan |
| 2009/0067191 A1 | 3/2009 | Faber |
| 2009/0122564 A1 | 5/2009 | Beadle |
| 2009/0168026 A1 | 7/2009 | Chen |
| 2009/0185377 A1* | 7/2009 | Johnson ............ F21V 21/0824 362/259 |
| 2009/0268121 A1 | 10/2009 | Hisada |
| 2010/0046211 A1 | 2/2010 | Spartano |
| 2010/0053969 A1 | 3/2010 | Weinheimer |
| 2012/0176782 A1 | 7/2012 | Vanderschuit |
| 2014/0036487 A1 | 8/2012 | Adams |
| 2013/0088152 A1* | 4/2013 | Hagen ............ H05B 33/0815 315/130 |
| 2013/0088723 A1 | 4/2013 | Feldkhun |
| 2013/0257297 A1 | 10/2013 | Schmidt |
| 2014/0268703 A1 | 9/2014 | Ehlert |
| 2014/0328060 A1 | 11/2014 | Gadegaard |
| 2015/0035437 A1 | 2/2015 | Panopoulos |
| 2015/0159842 A1 | 6/2015 | Zhang |
| 2015/0260385 A1* | 9/2015 | Brynjolfsson ........ F21V 23/045 315/152 |
| 2015/0308655 A1 | 10/2015 | Holmes |
| 2016/0313089 A1 | 10/2016 | Collin |
| 2016/0369996 A1 | 12/2016 | Qin |
| 2017/0045208 A1 | 2/2017 | Lentine |
| 2017/0045212 A1 | 2/2017 | Ghasabi |
| 2017/0080991 A1 | 3/2017 | White |

FOREIGN PATENT DOCUMENTS

| | | |
|---|---|---|
| CN | 203273720 | 11/2013 |
| CN | 203431698 | 2/2014 |
| CN | 204141534 | 2/2015 |
| CN | 303234579 S | 6/2015 |
| CN | 204629169 U | 9/2015 |
| CN | 205155727 | 4/2016 |
| CN | 303657559 | 4/2016 |
| EP | 1 024 399 | 2/2000 |
| GB | 2435090 | 8/2007 |
| WO | WO 2006/074205 | 7/2006 |
| WO | WO 2010022367 | 2/2010 |
| WO | WO 2015/094009 | 6/2015 |
| WO | WO 2015/138480 | 9/2015 |
| WO | WO 2015/143450 | 9/2015 |
| WO | WO 2015/149877 | 10/2015 |

OTHER PUBLICATIONS

Night Stars, available at www.amazon.com, accessed Nov. 13, 2015.
Poeland Garden Laser Landscape, available at www.amazon.com, accessed Nov. 13, 2015.
Remote Controllable RGB Laser, available at www.amazon.com, accessed Nov. 13, 2015.
Newest Garden Tree and Outdoor Wall Decoration Laser, available at www.amazon.com, accessed Nov. 13, 2015.

(56) References Cited

OTHER PUBLICATIONS

Pepnice Red and Green Firefly Laser Light, available at www.amazon.com, accessed Nov. 13, 2015.
KLAREN Color Laser Light Projector, available at www.amazon.com, accessed Nov. 13, 2015.
Garden Tree and Outdoor Wall Decoration Laser Lights for Holiday Lighting, available at www.amazon.com, accessed Nov. 13, 2015.
Green and Red Light Garden Tree and Outdoor Wall Decoration Laser Lights, available at www.amazon.com, accessed Nov. 13, 2015.
Moving RED and Green 2 Color Laser Landscape Projector Light w/ Remote, available at www.amazon.com, accessed Nov. 13, 2015.
SeresRoad Outdoor Waterproof Star Projector, Landscape Projector, available at www.amazon.com, accessed on Nov. 13, 2015.
Us-vision AGO-20RG Modern Outdoor/ Indoor 20 Patterns Gobos Rg Laser Projector, available at www.amazon.com, accessed Nov. 13, 2015.
Sminiker Outdoor Laser Light Sparkle Magic Lights Landscape Light Holiday Light, available at www.amazon.com, accessed Nov. 13, 2015.
Us-vision Outdoor Holiday Waterproof Green Laser Lighting Show, available at www.amazon.com, accessed Nov. 13, 2015.
Improvements All-metal 4-in-1 Projection Light with Remote, available at www.amazon.com, accessed Nov. 13, 2015.
KLAREN Color Laser Light Projector—Improvements, available at www.amazon.com, accessed Nov. 13, 2015.
Light Flurries, available at www.lightflurries.com, accessed Mar. 17, 2016.
Outdoor Indoor Spright Smart Firefly Light with Timer Green, available at www.amazon.com, accessed May 2, 2016.
Blisslights Spright Spring Smart Outdoor Indoor Firefly Light Projector with Timer, available at www.amazon.com, accessed May 2, 2016.
Mr. Christmas Super Green Laser Light Show, available at www.amazon.com, accessed May 2, 2016.
BlissLights Motion Laser, available at www.amazon.com, accessed May 2, 2016.
Color Laser Lights Instructions, published 2014.
BlissLights Spright Smart User Guide, published 2014.
Written Opinion of International Search Authority PCT/US2016/021354, published Jun. 30, 2016.
International Search Report PCT/US2016/021354, published Jun. 30, 2016.
International Search Report PCT/US2016/021347, published May 17, 2016.
Written Opinion of International Search Authority PCT/US2016/021347, published May 17, 2016.
International Search Report PCT/US2016/021338, published May 16, 2016.
Written Opinion of International Search Authority PCT/US2016/021338, published May 16, 2016.
Examination Report of Application No. 2016101293 by IP Australia, dated Oct. 20, 2016.
Laser Christmas Lights & Outdoor Laser Lights, dated Oct. 6, 2015, available at http://web.archive.org/web/20151006140058/http://www.laserchristmaslights.com.
Examination Report of Application No. 2016101295 by IP Australia, dated Oct. 20, 2016.
Extended European Search Report of Application No. 16197893 by European Patent Office, dated Feb. 24, 2017.
Extended European Search Report of Application No. 16197896 by European Patent Office, dated Mar. 13, 2017.
Examination Report of Application No. 2016101293 by IP Australia, dated Feb. 17, 2017.
Extended European Search Report of Application No. 16197894.5-1568 by European Patent Office, dated Feb. 17, 2017.
Office Action of Application No. 2,937,150 by Canadian Intellectual Property Office, dated Jan. 26, 2017.
Peatross, Physics of Light and Optics, Mar. 22, 2017, pp. 288-295, 303.
Laser Projector Yard Stake Sell Sheet by YFC-BonEagle, Copyright 2011.
Consumer Electronics Show Flyer by Prime, Jan. 2014.
Extended European Search Report of Application No. 16197895 by European Patent Office, dated Apr. 28, 2017.
Declaration of Stephen D. Fantone dated Jul. 3, 2017, Submitted in support of response to Order to Show Cause (Civil Action No. 2:17-cv-02878).
Everstar Merchandising Product Number 88-506.
Everstar Merchandising Product Number 68-005 (US)/88-653 (CAN).
Request for Ex Parte Reexamination of U.S. 9,546,775, dated Jul. 13, 2017.
Office Action of Application No. 2,937,150 by Canadian Intellectual Property Office, dated Jun. 30, 2017.
Examination Report of Application No. 2017100480 by IP Australia, dated Jun. 8, 2017.
Office Action of Application No. 2,965,063 by Canadian Intellectual Property Office, dated Jun. 16, 2017.

* cited by examiner

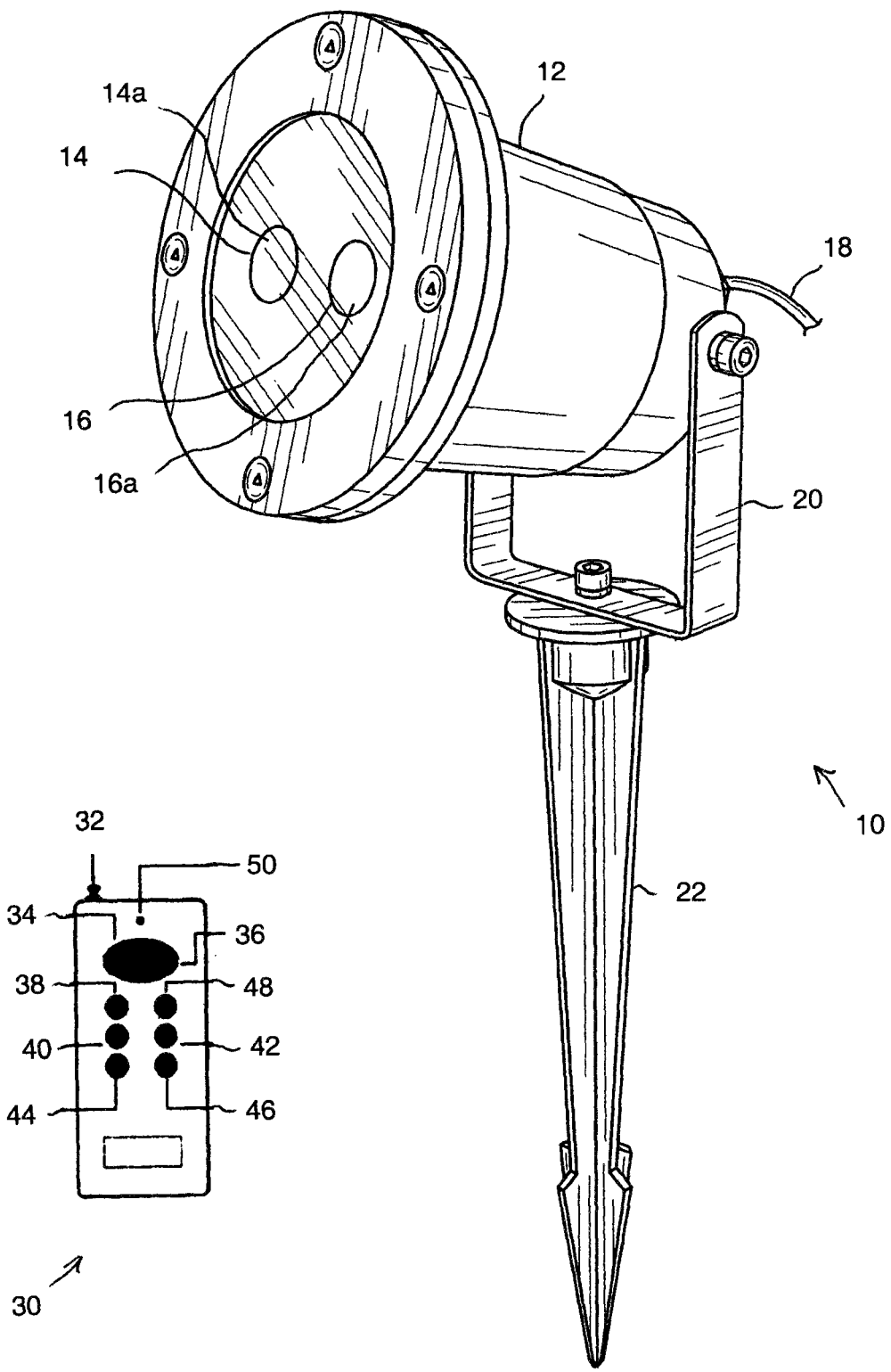

LANDSCAPE LIGHT

CROSS REFERENCE TO RELATED APPLICATIONS

This application is a continuation application of U.S. application Ser. No. 14/801,458, filed on Jul. 16, 2015, which claims the benefit of the U.S. Provisional Patent Application Ser. No. 62/025,344, filed on Jul. 16, 2015. These applications are hereby incorporated by reference in their entireties.

FIELD

The present invention relates generally to lighting devices, and more particularly to an improved landscape lighting apparatus.

BACKGROUND

U.S. Pat. Nos. 7,641,345 and 8,057,045 to Johnson discloses a projection apparatus for generating a moving star field and a cloud-like effect comprises a means for generating a cloud-like effect using at least one non-coherent light source, a means for generating a moving star field using at least one coherent light source and a means for regulating and supplying electric power. The means for generating cloud-like effect using at least one non-coherent light source comprises at least one pair of condenser lenses and an interferential filter wheel rotated by a motor, disposed between at least one pair of condenser lenses. The means for generating the moving star field using a coherent light source comprises a grating wheel rotated by a motor and a diffractive optical element disposed between the at least one coherent light source and the grating wheel.

U.S. Pat. No. 8,100,537 to Johnson describes a laser landscape lighting apparatus for use in accent lighting applications for landscapes and outdoor venues. In one embodiment, the laser landscape lighting apparatus includes a coherent light source in combination with a diffractive optical element and optionally a diffraction grating wheel. The diffractive optical element may be, for example, a holographic optical element. In some embodiments, the laser landscape lighting apparatus includes a temperature-controlled integral derivative system. In one application, the laser landscape lighting apparatus may project a static or movable star field.

The foregoing patents reflect the current state of the art of which the present inventor is aware. Reference to, and discussion of, these patent is intended to aid in discharging Applicant's acknowledged duty of candor in disclosing information that may be relevant to the examination of claims to the present invention. However, it is respectfully submitted that none of the above patents disclose, teach, suggest, show, or otherwise render obvious, either singly or when considered in combination, the invention described and claimed herein.

SUMMARY

The present invention provides a landscape light incorporating two or more lasers or LEDs of different colors (e.g., red, green, white, blue) in the same housing, each laser or LED preferably having a separate lens. The present invention thus provides a decorative landscape light apparatus that is ideal for both indoor and outdoor use. The apparatus projects points of brightly colored light onto walls, dance floors, landscapes, pools, gazebos, etc., enabling the user to create an instant atmosphere for parties and entertaining or add a splash of color and interest to their home, yard, or garden. The apparatus projects any of a variety of colors including red, green, white, blue, or other colors, or combinations of any colors, as well as providing an optional flash/pulse setting for the lights.

The apparatus preferably includes an RF remote which enables the user to control the apparatus from anywhere in and around the house. The apparatus may also include a built-in timer which runs the lights for selected periods such as 2, 4, 6, or 8 hours.

Diffractive holographic optics are used with the lasers to scatter the beam of energy and cause the energy concentration to drop below the exposure limits for momentary or accidental viewing at a relatively short distance from the laser aperture.

It is therefore an object of the present invention to provide a new and improved landscape light apparatus.

It is another object of the present invention to provide a new and improved landscape light incorporating two or more lasers or LEDs of different colors (e.g., red, green, white, blue) in the same housing.

It is another object of the present invention to provide a new and improved landscape light apparatus that is safe to use and easy to operate.

It is a further object of the present invention to provide a new and improved landscape light apparatus that can be remotely controlled.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawing wherein:

FIG. 1 is a front perspective view of a landscape light apparatus of this invention.

DETAILED DESCRIPTION

Referring to FIG. 1, there is described and illustrated therein a new and improved landscape light apparatus, generally denominated 10 therein.

The inventive landscape light 10 includes a light projector housing 12 which incorporates two or more lasers or LEDs 14, 16 of different colors (e.g., red, green, white, blue) in the housing 12, each laser or LED preferably having a separate lens 14a, 16a. The apparatus also includes power cord 18 connected to a power supply or transformer (not illustrated), mounting bracket 20, and ground stake 22. The apparatus projects red, green, white, or other colors, or combinations of colors, as well as an optional flash/pulse setting.

The RF remote control 30 enables the user to control the apparatus from anywhere in and around the house, and may include antenna 32 (when extended, the remote may have a range of 25-35 feet or more), light on/off control 34, change light color control 36 (chooses either colored light, or both lights), flash setting control 38 (toggles between flashing or steady light), 2-hour timer control 40 (sets the unit on a 2-hours on, 22-hours off daily cycle), 4-hour timer control 42 (4-hours on, 20-hours off), 6-hour timer control 44 (6-hours on, 18 hours off), 8-hour 20 timer control 46 (8-hours on, 16-hours off), timer cancel control 48 (cancels the timer settings), and LED status light 50 (illuminates when buttons are operated).

Diffractive holographic optics are used with the lasers to scatter the beam of energy and cause the energy concentration to drop below the exposure limits for momentary or accidental viewing at a relatively short distance from the laser aperture.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A landscape light comprising:
   a light projector housing incorporating a first laser generating a first light having a first color and a second laser generating a second light having a second color, each laser having a separate lens: and
   diffractive holographic optics to scatter the first and second lights and cause an energy concentration of the first and second lights to drop below exposure limits for momentary or accidental viewing at a relatively short distance from the landscape light.

2. The landscape light of claim 1 further including a power cord, mounting bracket, and ground stake.

3. The landscape light of claim 1 further including a remote control to enable a user to control the landscape light from a distance.

4. The landscape light of claim 3 wherein said remote control includes a light on/off control.

5. The landscape light of claim 3 wherein said remote control includes a change light color control.

6. The landscape light of claim 3 wherein said remote control includes a flash setting control.

7. The landscape light of claim 3 wherein said remote control eludes a timer control.

8. The landscape light of claim 3 wherein said remote control includes a light on/off control, a change light color control, and a flash setting control.

9. A landscape light comprising:
   a light projector housing including a plurality of light sources producing a plurality of lights, each light source having a different color and each light source having a separate lens; and
   diffractive holographic optics to scatter the plurality of lights and cause an energy concentration of the plurality of lights to drop below exposure limits for momentary or accidental viewing at a relatively short distance from the landscape light; and,
   the plurality of light sources consisting of two lasers.

10. A landscape light comprising:
    a light projector housing incorporating at least two lasers, each laser having a different color and each laser having a separate lens, and including diffractive holographic optics to scatter the lasers and cause an energy concentration of the lasers to drop below exposure limits for momentary or accidental viewing at a relatively short distance from the landscape light;
    a mounting stake configured to be coupled to the housing; and,
    a remote to enable a user to control the landscape light from a distance, the remote including a light ON/OFF control and an operation mode.

11. The landscape light of claim 10 wherein the operation mode includes a flash setting control.

* * * * *

(12) EX PARTE REEXAMINATION CERTIFICATE (11405th)
United States Patent
Lentine

(10) Number: US 9,752,761 C1
(45) Certificate Issued: Nov. 2, 2018

(54) LANDSCAPE LIGHT

(71) Applicant: Telebrands Corp., Fairfield, NJ (US)

(72) Inventor: Lou Lentine, Chattanooga, TN (US)

(73) Assignee: TELEBRANDS CORP., Fairfield, NJ (US)

Reexamination Request:
No. 90/014,044, Nov. 6, 2017

Reexamination Certificate for:
Patent No.: 9,752,761
Issued: Sep. 5, 2017
Appl. No.: 15/142,789
Filed: Apr. 29, 2016

Related U.S. Application Data

(63) Continuation of application No. 14/801,458, filed on Jul. 16, 2015.

(Continued)

(51) Int. Cl.
*F21V 21/08* (2006.01)
*F21V 23/04* (2006.01)
*F21V 15/01* (2006.01)
*F21V 5/04* (2006.01)
*F21V 23/00* (2015.01)
*G02B 5/02* (2006.01)
*F21S 8/08* (2006.01)
*F21S 6/00* (2006.01)
*G02B 7/00* (2006.01)
*G02B 26/00* (2006.01)
*G02B 27/20* (2006.01)
*H05B 33/08* (2006.01)
(Continued)

(52) U.S. Cl.
CPC .......... *F21V 21/0824* (2013.01); *F21S 6/001* (2013.01); *F21S 8/081* (2013.01); *F21S 10/007* (2013.01); *F21S 10/06* (2013.01); *F21V 5/04* (2013.01); *F21V 15/01* (2013.01); *F21V 21/30* (2013.01); *F21V 23/001* (2013.01); *F21V 23/045* (2013.01); *F21V 23/0407* (2013.01); *F21V 23/0435* (2013.01); *F21V 29/83* (2015.01); *G02B 5/0252* (2013.01); *G02B 7/006* (2013.01); *G02B 7/008* (2013.01); *G02B 26/008* (2013.01); *G02B 27/20* (2013.01); *H05B 33/0857* (2013.01); *H05B 37/0281* (2013.01); *F21S 9/03* (2013.01); *F21S 10/023* (2013.01); *F21V 7/045* (2013.01); *F21V 17/02* (2013.01); *F21V 23/0471* (2013.01); *F21V 29/507* (2015.01); *F21V 29/74* (2015.01); *F21V 31/00* (2013.01); *F21V 33/0052* (2013.01); *F21W 2121/00* (2013.01); *F21W 2121/006* (2013.01); *F21W 2131/10* (2013.01); *F21W 2131/107* (2013.01); *F21W 2131/109* (2013.01); *F21Y 2113/10* (2016.08); *F21Y 2113/13* (2016.08); *F21Y 2115/10* (2016.08); *F21Y 2115/30* (2016.08); *Y02B 20/72* (2013.01)

(58) Field of Classification Search
None
See application file for complete search history.

(56) References Cited

To view the complete listing of prior art documents cited during the proceeding for Reexamination Control Number 90/014,044, please refer to the USPTO's public Patent Application Information Retrieval (PAIR) system under the Display References tab.

*Primary Examiner* — James A Menefee

(57) ABSTRACT

A landscape light incorporating two or more lasers or LEDs of different colors (e.g., red, green, white, blue) in the same housing, each laser or LED preferably having a separate lens. The apparatus projects any of a variety of colors including red, green, white, blue, or other colors, or combinations of any colors, as well as providing an optional flash/pulse setting for the lights. The apparatus preferably includes an RF remote which enables the user to control the apparatus from anywhere in and around the house, and may also include a built-in timer which runs the lights for selected periods such as 2, 4, 6, or 8 hours.

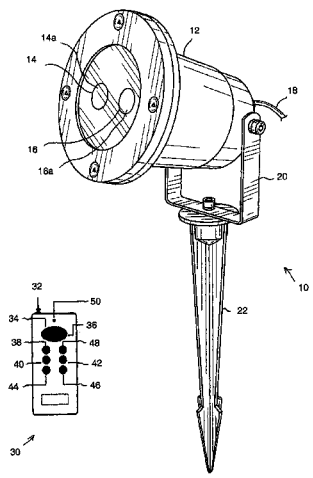

Related U.S. Application Data

(60) Provisional application No. 62/025,344, filed on Jul. 16, 2014.

(51) Int. Cl.
*F21V 29/83* (2015.01)
*F21S 10/00* (2006.01)
*H05B 37/02* (2006.01)
*F21V 21/30* (2006.01)
*F21S 10/06* (2006.01)
F21W 131/10 (2006.01)
F21Y 115/30 (2016.01)
F21Y 113/10 (2016.01)
F21W 121/00 (2006.01)
F21V 31/00 (2006.01)
F21V 7/04 (2006.01)
F21V 17/02 (2006.01)
F21W 131/107 (2006.01)
F21V 29/507 (2015.01)
F21V 29/74 (2015.01)
F21S 9/03 (2006.01)
F21Y 113/13 (2016.01)
F21W 131/109 (2006.01)
F21S 10/02 (2006.01)
F21V 33/00 (2006.01)
F21Y 115/10 (2016.01)

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-11 are cancelled.

* * * * *